United States Patent
Lobban et al.

(10) Patent No.: US 12,494,921 B2
(45) Date of Patent: *Dec. 9, 2025

(54) SYSTEMS AND METHODS FOR MAINTAINING DECENTRALIZED DIGITAL IDENTITIES

(71) Applicant: JPMORGAN CHASE BANK, N.A., New York, NY (US)

(72) Inventors: Tyrone Lobban, Loughton (GB); Christine Moy, New York, NY (US); Kanishk Mahajan, San Francisco, CA (US); Martin Kocen, Bratislava (SK); Jaroslav Saxa, Bratislava (SK); Oliver Margolis, London (GB); Bruce Horner, New York, NY (US); Christine Leong, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/475,840

(22) Filed: Sep. 27, 2023

(65) Prior Publication Data

US 2024/0031167 A1   Jan. 25, 2024

Related U.S. Application Data

(63) Continuation of application No. 16/878,457, filed on May 19, 2020, now Pat. No. 11,838,425.

(Continued)

(51) Int. Cl.
*H04L 29/06* (2006.01)
*G06F 16/27* (2019.01)

(Continued)

(52) U.S. Cl.
CPC ............ *H04L 9/3247* (2013.01); *G06F 16/27* (2019.01); *H04L 9/30* (2013.01); *G06N 20/00* (2019.01)

(58) Field of Classification Search
CPC ....... H04L 9/3247; H04L 9/30; H04L 9/3239; H04L 9/3268; H04L 9/50; H04L 9/00;
(Continued)

(56) References Cited

U.S. PATENT DOCUMENTS

2014/0108263 A1   4/2014 Ortiz et al.
2017/0109759 A1*  4/2017 Korb ................. G06F 21/10
(Continued)

OTHER PUBLICATIONS

International Search Report, dated Jul. 15, 2020, from corresponding International Application No. PCT/US2020/033698.
(Continued)

*Primary Examiner* — Joseph P Hirl
*Assistant Examiner* — Leynna Truvan
(74) *Attorney, Agent, or Firm* — GREENBERG TRAURIG LLP

(57) ABSTRACT

Systems and methods for maintaining decentralized digital identities are disclosed. In an information processing apparatus for a relying party within a distributed ledger network and comprising at least one computer processor, a method for decentralized digital identity attestation verification may include: (1) receiving, from a relying party, an attestation verification request for a user; (2) retrieving a user decentralized identifier for the user; (3) retrieving an attestation issuer decentralized identifier for an attestation issuer; (4) validating the user decentralized identifier and the attestation issuer decentralized identifier; (5) verifying that the attestation has not been revoked; and (6) communicating that the attestation is valid to the relying party.

14 Claims, 5 Drawing Sheets

Related U.S. Application Data

(60) Provisional application No. 62/850,181, filed on May 20, 2019.

(51) Int. Cl.
*H04L 9/30* (2006.01)
*H04L 9/32* (2006.01)
*G06N 20/00* (2019.01)

(58) Field of Classification Search
CPC ..... H04L 9/088; H04L 9/3213; H04L 9/3226; H04L 9/3231; H04L 9/3234; H04L 9/3263; H04L 9/3273; H04L 61/4547; H04L 61/2571; G06F 16/27; G06F 21/45; G06F 21/6245; G06F 15/785; G06N 20/00; G06Q 10/00; G06Q 20/206; G06Q 20/40; G06Q 20/4012; G05B 2219/33276; G05B 2219/31034; G01G 23/3735; H04B 7/2696; G11B 20/00144; G11B 20/00181; H04M 3/4211; H04M 15/755; H04M 2203/6054; H04M 2215/7222; G01N 35/00722; G03C 8/423; G03G 15/5091; G03G 2215/0695; H04N 21/4182; H04N 21/42684; H04N 21/4753; H04N 2201/3221; H04N 2201/3226; H04N 2201/3228
See application file for complete search history.

(56) References Cited

U.S. PATENT DOCUMENTS

| | | |
|---|---|---|
| 2017/0180128 A1 | 6/2017 | Lu |
| 2017/0206532 A1 | 7/2017 | Choi |
| 2017/0250972 A1 | 8/2017 | Ronda et al. |
| 2017/0317997 A1 | 11/2017 | Smith |
| 2018/0039667 A1* | 2/2018 | Pierce .................. H04L 9/3247 |
| 2018/0122031 A1 | 5/2018 | Chabanne et al. |
| 2018/0234433 A1* | 8/2018 | Oberhauser ............ G06Q 20/02 |
| 2019/0068608 A1 | 2/2019 | Boland |
| 2020/0137064 A1* | 4/2020 | Wu ........................ G06F 16/182 |

OTHER PUBLICATIONS

Written Opinion of the International Searching Authority, dated Jul. 15, 2020, from corresponding International Application No. PCT/US2020/033698.

* cited by examiner

SYSTEMS AND METHODS FOR MAINTAINING DECENTRALIZED DIGITAL IDENTITIES

RELATED APPLICATIONS

This application is a Continuation of U.S. patent application Ser. No. 16/878,457, now U.S. Pat. No. 11,838,425, filed May 19, 2020, which claims priority to, and the benefit of, U.S. Provisional Patent Application Ser. No. 62/850,181, filed May 20, 2019, the disclosure of each of which is hereby incorporated, by reference, in its entirety.

BACKGROUND OF THE INVENTION

1. Field of the Invention

The present disclosure generally relates to systems and methods for maintaining decentralized digital identities.

2. Description of the Related Art

Users may maintain digital identities on their mobile devices, such as their name, contact information, social security number, banking account numbers, etc. This identity information is highly sensitive, as it represents an individual and is a means of access to life. Thus, it is important that this information be securely stored.

The maintenance of the user's identity information must meet regulatory requirements, such as the General Data Protection Regulation (GDPR). Users should be allowed to destroy or remove their own identities as they are self-sovereign.

SUMMARY OF THE INVENTION

Systems and methods for maintaining decentralized digital identities are disclosed.

In one embodiment, a method for decentralized identity initialization may include: (1) generating an attestation issuer decentralized identifier and a public and private key pair for an attestation issuer, wherein the attestation issuer decentralized identifier is written to the distributed ledger; (2) generating a relying party decentralized identifier and a public and private key pair for a relying party, wherein the relying party decentralized identifier is written to the distributed ledger; and (3) generating a user decentralized identifier and a public and private key pair for a user, wherein the user decentralized identifier and the public key for the user are written to the distributed ledger.

According to another embodiment, in an information processing apparatus for an attestation issuer within a distributed ledger network and comprising at least one computer processor, a method for attestation issuance may include: (1) receiving, from a computer program executed by a mobile electronic device associated with a user, a request to issue an attestation; (2) authenticating the user; (3) receiving a decentralized identifier for the user from a distributed ledger; (4) receiving, from the computer program, acceptance of the attestation; (5) creating and signing the attestation; and (6) communicating the attestation to the computer program.

In one embodiment, the computer program may select the attestation issuer based on a type of the attestation, based on an identification of the relying party, based on machine learning, etc.

According to another embodiment, in an information processing apparatus for a relying party within a distributed ledger network and comprising at least one computer processor, a method for attestation revocation may include: (1) receiving, from a user or an attestation issuer, a request to revoke an attestation issued by the attestation issuer; (2) retrieving a decentralized identifier for the user; and (3) removing the decentralized identifier for the user from the attestation issuer's list of valid issued attestations, or adds the decentralized identifier to a list of the attestation issuer's list of revoked attestations.

In one embodiment, the attestation issuer may automatically request revocation in response to a user change in circumstances with regard to the attestation issuer. The change in circumstances may be a change in user employment status, a change in circumstances is a change in user account status, a change in user location, etc.

In one embodiment, the method may further include sending a confirmation of revocation to at least one of the user and the attestation issuer.

According to another embodiment, in an information processing apparatus for a relying party within a distributed ledger network and comprising at least one computer processor, a method for decentralized digital identity attestation verification may include: (1) receiving, from a relying party, an attestation verification request for a user; (2) retrieving a user decentralized identifier for the user; (3) retrieving an attestation issuer decentralized identifier for an attestation issuer; (4) validating the user decentralized identifier and the attestation issuer decentralized identifier; (5) verifying that the attestation has not been revoked; and (6) communicating that the attestation is valid to the relying party.

In one embodiment, the method may further include verifying the signature on the attestation verification request.

In one embodiment, the attestation verification request may be received via a mobile application executed by the user;

In one embodiment, the relying party may present the request to the mobile application as a machine-readable code.

In one embodiment, the request may be signed with a private key for the user.

In one embodiment, wherein the attestation is verified to not be revoked by determining that the user decentralized is not on a list of revoked attestations for the attestation issuer, and/or by determining that the user decentralized identifier is on a list of valid attestations for the attestation issuer.

In one embodiment, the method may further include retrieving, from the distributed ledger, a public key for the user; retrieving, from the distributed ledger, a public key for the attestation issuer; validating a user signature on the attestation using the public key for the user; and validating an attestation issuer signature on the attestation using the public key for the attestation issuer.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are related to systems and methods for maintaining decentralized digital identities.

In embodiments, users are in control of their own data and the disclosure of their data, and may not give up their data to third parties in order to access third party services. Users may retain control of their own data and have explicit control over private keys that they use to guarantee authenticity of their data. The user's data and private keys may be managed, for example, by a mobile application etc.

In embodiments, users may directly share their data with organizations without depending on any organization to do so.

In one embodiment, user may have information regarding what parties can track information, what parties have information, when that information was received, etc.

In one embodiment, an issuer may only need to validate a user once, providing cryptographic proof of that validation for others to use when authenticating users.

Embodiments may use open-source software and established digital standards.

As used herein, an "attestation" may refer to a verifiable claim that contains attributes about the holder or user in relation to the attestation issuer. An attestation may have explicit expiration dates. An attestation may be as finely grained as a single attribute, or it may include several attributes. Additionally, users may provide these attestations in a zero-knowledge type manner, thereby preventing any information being revealed to third parties while guaranteeing the validity of the user's attributes.

Figure 1:
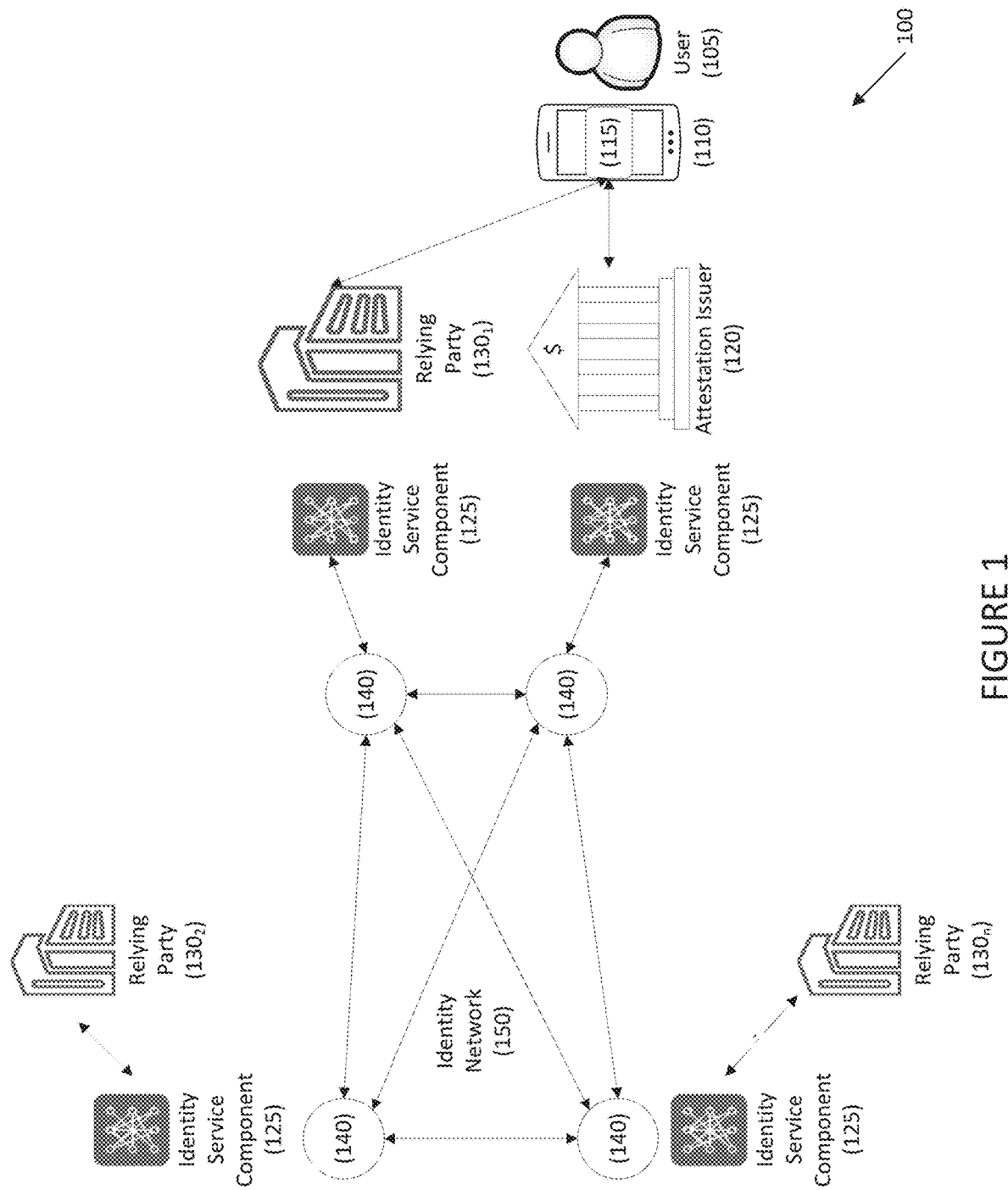
FIG. 1 depicts a system for maintaining decentralized digital identities according to one embodiment.

FIG. 1 depicts a system for maintaining decentralized digital identities according to one embodiment. System 100 may include user 105 may user mobile electronic device 110, which may execute mobile identity program or application 115. Mobile electronic device 110 may be any suitable electronic device, including computers (e.g., notebook computers, desktop computers, tablet computers, etc.), smart watches, Internet of Things (IoT) appliances, etc.

Mobile identity program or application 115 may manage user 105's private key, and may store user 105's attestations. In one embodiment, the private key may be protected using, for example, biometrics.

Mobile identity program or application 115 may also store user 105's decentralized identifier, which may be unique and may be resolved to a standard resource (a DID document) to describe an entity.

Mobile identity program or application 115 may interface with attestation issuer 120, which may include a backend (not shown), and one or more relying party 130. Attestation issuer 120 may participate in identity network 150, which may be a distributed-ledger based network, via node 140. A suitable distributed ledger network is Quorum, provided by JPMorgan Chase Bank, N. A. Other distributed ledgers may be used as is necessary and/or desired.

In one embodiment, attestation issuer 120 may be any entity that may issue an attestation on which relying party 130 may wish to rely. For example, attestation issuer 120 may be a government agency, an employer, a bank, etc.

Although FIG. 1 only depicts one attestation issuer 120, it should be recognized that a greater number may be included as is necessary and/or desired.

Attestation issuer 120 may publish user 105's public key to identity network 150. It may also publish its own public key to the identity network.

Relying parties 130 may participate in identity network 150 via node 140. Relying parties 130 may provide machine-readable codes to user 105 for requesting an attestation.

Identity service component 125 may be provided for attestation issuer 120 and relying parties 130. In one embodiment, for attestation issuer 120, identity service component 125 may create and revoke attestations. For relying parties 130, identity service component 125 may receive and store attestations.

Figure 2:
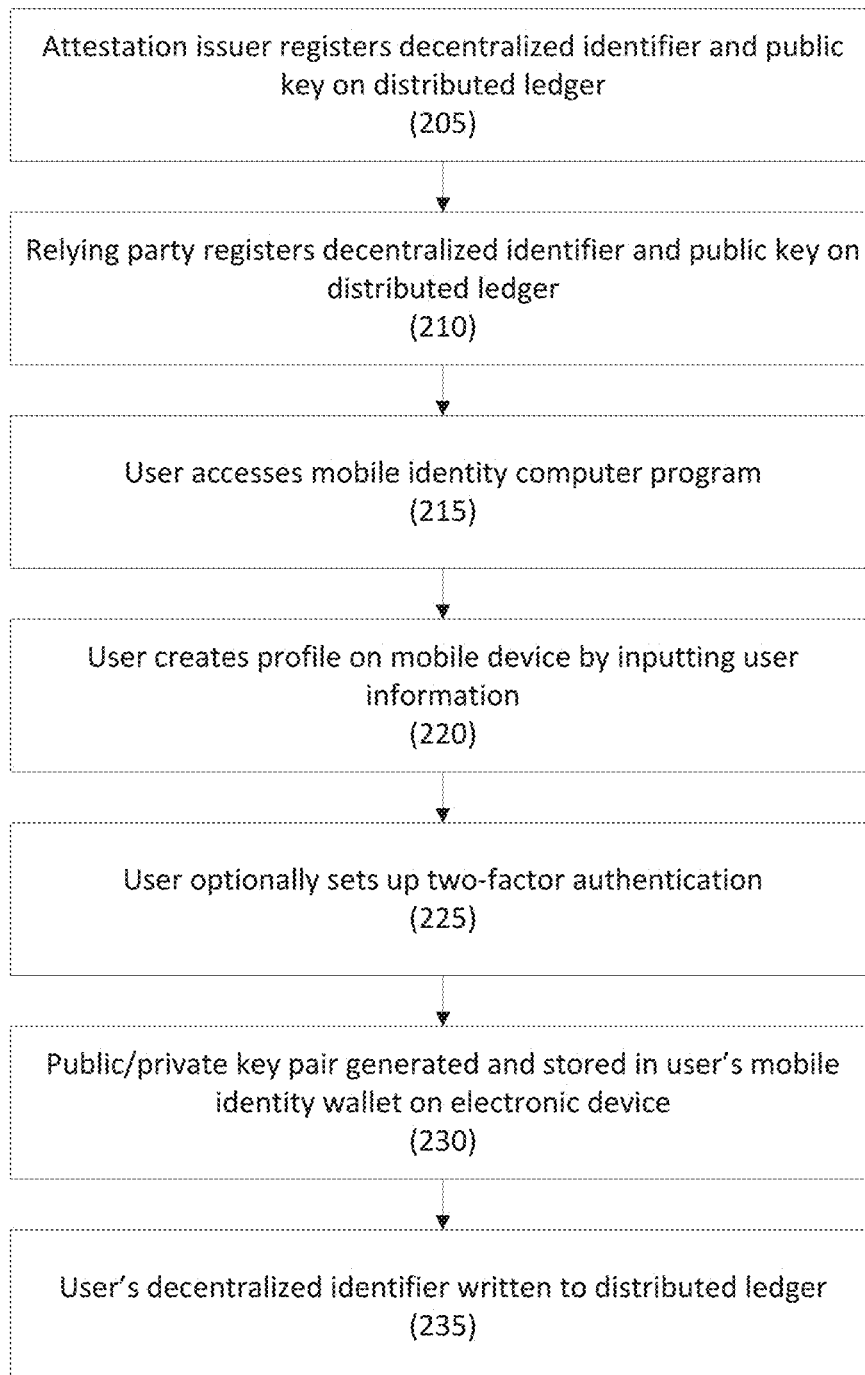
FIG. 2 depicts a method for maintaining decentralized digital identities according to one embodiment.

Referring to FIG. 2, a method for decentralized digital identity initialization is disclosed according to one embodiment.

In step 205, an attestation issuer may register its decentralized identifier on a distributed ledger, such as a blockchain-based ledger. In one embodiment, the attestation issuer's decentralized identifier may have been generated by the identity service component, and the attestation issuer's public key may be stored with the attestation issuer's decentralized identifier.

In step 210, a relying party may register its decentralized identifier on the distributed ledger. In one embodiment, the relying party's decentralized identifier may have been generated by the identity service component, and the relying party's public key may be stored with the relying party's decentralized identifier.

The relying party's public key may be written to the distributed ledger.

In step 215, a user may access an identity computer program, such as a mobile identity computer program executed on the user's mobile electronic device. In step 220, the user may then create a profile on the mobile electronic device by inputting information about the user, such as the user's name, contact information, date of birth, etc. The user may also, in step 225, set up two-factor authentication. Other mechanisms for authentication may be used as is necessary and/or desired.

In step 230, a public and private key pair may be generated for the user, and the key pair may be stored in the user's mobile electronic wallet on the user's mobile electronic device. In one embodiment, an identity service component in the identity network may perform this step.

In step 235, the user's decentralized identifier may be written to the distributed ledger. In one embodiment, the user's decentralized identifier may be generated by the application on the user's device, and the user's public key may be stored with the user's decentralized identifier.

Figure 3:
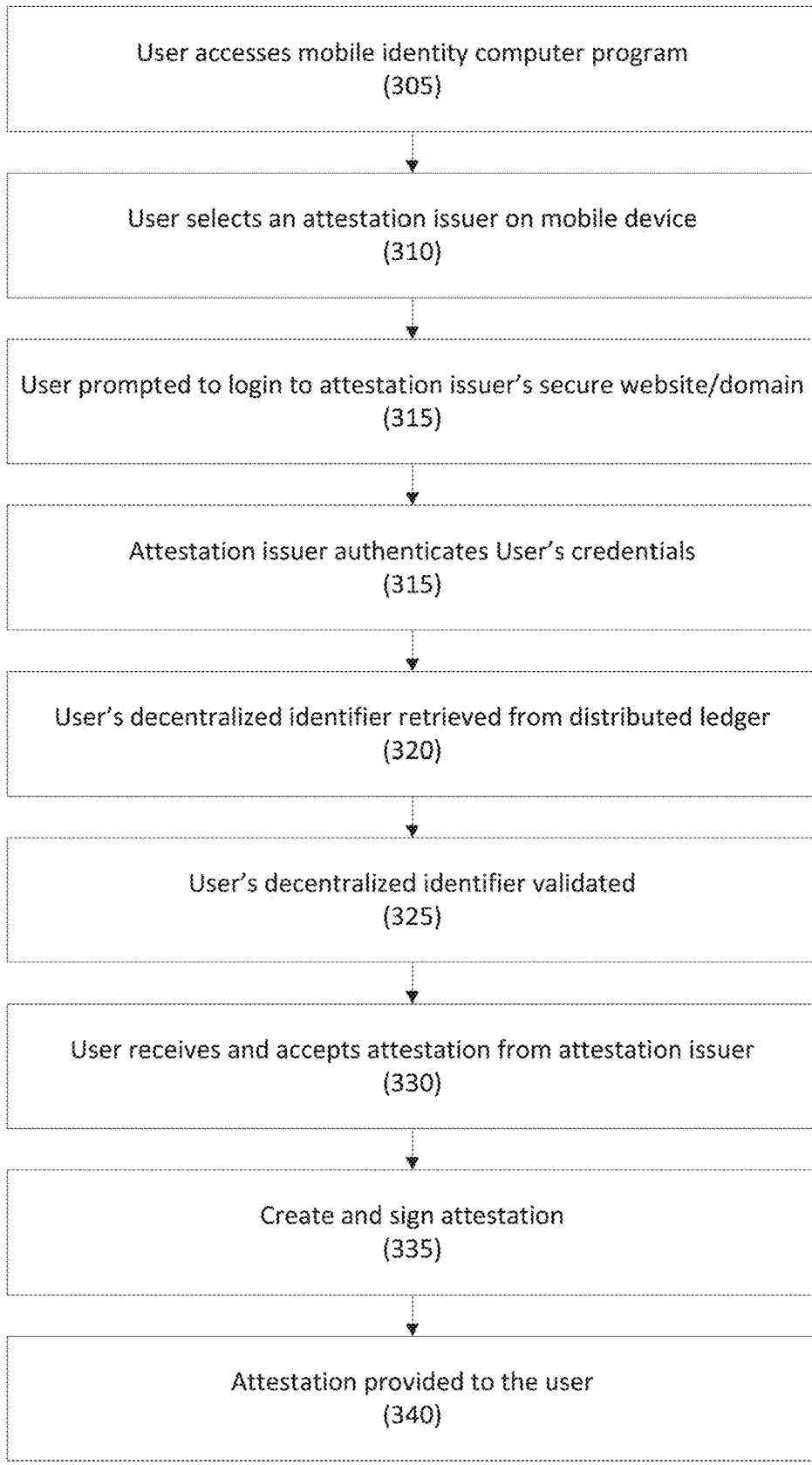
FIG. 3 depicts a method for attestation issuance according to one embodiment.

FIG. 3 depicts a method for attestation issuance is disclosed according to one embodiment.

In step 305, a user may access an identity computer program, such as a mobile identity computer program executed on the user's mobile electronic device.

In step 310, the user may select an attestation issuer in the mobile identity application. In one embodiment, the user may select the attestation issuer based on the attestation sought.

In another embodiment, the mobile identity application may select the attestation issuer based on an identification of the relying party.

In one embodiment, machine learning may be used to automatically select the proper attestation issuer.

In step 315, the selected attestation issuer may authenticate the user by, for example, authenticating the user's credentials.

In step 320, the selected attestation issuer may receive the user's decentralized identifier from the distributed ledger, and in step 325, may validate the user's decentralized identifier. For example, the selected attestation issuer may check to see if the user's decentralized identifier has been registered on, for example, the distributed ledger.

In step 330, the user may receive and accept an attestation from the attestation issuer. For example, if the user is seeking an attestation regarding his or her employment, the attestation issuer may provide user's title, dates of employment, salary, etc.

In step 335, the attestation may be created and signed. For example, an identity service component within the privacy network may create and sign the attestation.

In step 340, the signed attestation may be provided to the user. For example, the identity service component may send the signed attestation to the user. The user may then provide the signed attestation to the relying party.

Figure 4:
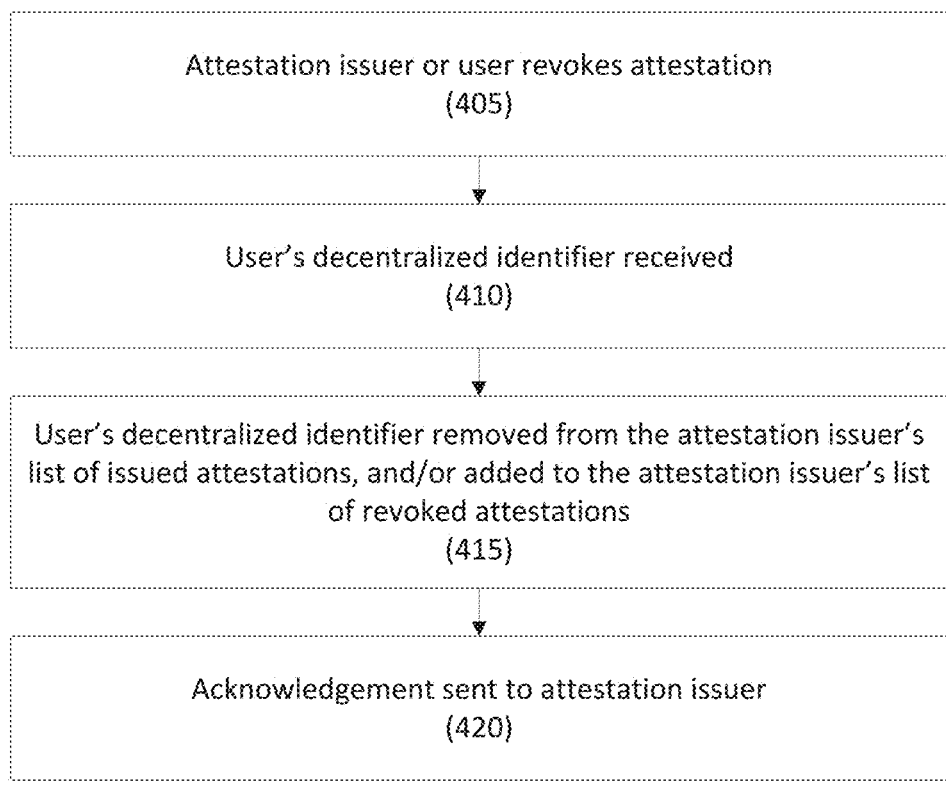
FIG. 4 depicts a method for attestation revocation according to one embodiment.

FIG. 4 depicts a method for attestation revocation is disclosed according to one embodiment. In step 405, an attestation issuer or a user may revoke an attestation issued by an attestation issuer. For example, if a user is no longer employed by an attestation issuer, the attestation issuer may revoke an attestation related to the user's employment.

In one embodiment, the attestation issuer may automatically request the revocation in response to a change in circumstances for the user. For example, if the attestation issuer is an employer and the user's employment is terminated, the attestation issuer may automatically request revocation of an employment attestation. If the attestation issuer is a financial institution and the user closes an account with the financial institution, the attestation issuer may automatically revoke the account attestation. Other changes in circumstances my trigger revocation as is necessary and/or desired.

In step 410, the user's decentralized identifier may be retrieved. For example, the identity service component may receive the revocation request, and may retrieve the user's decentralized identifier from, for example, the distributed ledger based on the attestation. As another example, the user's decentralized identifier may be in the attestation, in an off-chain mapping of the user to the decentralized identifier, etc.

In step 415, the user's decentralized identity may be removed from a list of valid attestations issued by the attestation issuer. In another embodiment, the user's decentralized identity may be added to a list of attestations issued by the attestation issuer that have been revoked or are no longer valid.

In one embodiment, the identify service component may remove and/or add the decentralized identifier to the lists.

In step 420, after the attestation is revoked, a confirmation may be provided to the attestation issuer and/or the user. In one embodiment, the attestation issuer may take additional actions, such as issuing a new attestation for the user (e.g., issue a new attestation related to the user's former employment).

Figure 5:
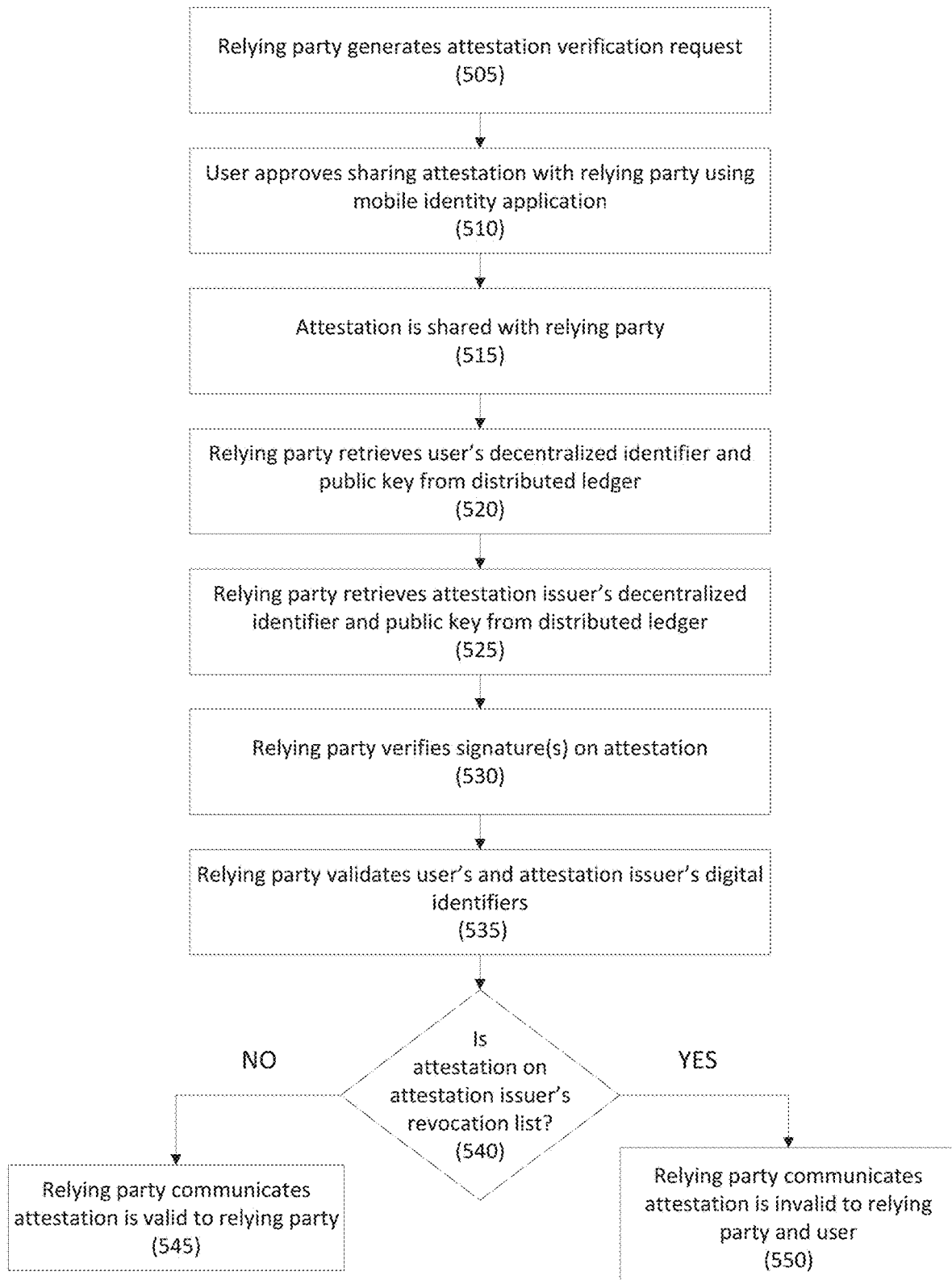
FIG. 5 depicts a method for decentralized digital identity attestation verification according to one embodiment.

Referring to FIG. 5, a method for decentralized digital identity attestation verification is provided according to one embodiment.

In step 505, a relying party may generate an attestation verification request. In one embodiment, the relying party may generate, for example, a machine-readable code (e.g., a QR code) may include a request to present an attestation to the relying party.

In one embodiment, the relying party and the interface component may receive the attestations based on attestation verification request from the relying party that was displayed via the machine-readable code from the user device. When the user presents attestations that are signed by the issuer attestation, the user (e.g., the user's identity application) may add its own signature and timestamp as consent. The signed attestation may then be transferred over to the relying party and/or the interface component.

For example, the machine-readable code may include a call-back URL (with correlation information) to where the verifiable attestation is to be transferred.

The user may receive the request by scanning the machine-readable code, entering an identifier, etc. for the relying party.

In one embodiment, the mobile identity program may securely communicate with an interface component by, for example, using the machine-readable code to establish communication between two parties that are not aware of each other, by discovery invocation of an attestation issuance service by means of user OpenID Connect (OIDC) authentication, etc.

In step 510, using the mobile identity program, the user may approve the request.

In step 515, the attestation may be shared with the relying party, such as with the relying party's identity service component. In one embodiment, the attestation may be shared directly from the user's mobile privacy program, or the mobile privacy program may request that the attestation issuer share the attestation with the relying party by reading the Issuer's and User's public keys from the distributed ledger.

In step 520, the relying party may retrieve the user's decentralized identifier from the distributed ledger, and, in step 525, may retrieve the attestation issuer's decentralized identifier from the distributed ledger. For example, the relying party's identity service component may retrieve the decentralized identifiers.

In step 530, the relying party may verify the signature on the attestation. For example, the relying party's identity service component may perform the verification.

In step 535, the relying party may validate both the user's decentralized identifier and the attestation issuer's decentralized identifier. For example, the relying party's identity service component may perform the validation.

In step 540, the relying party may check to see if the attestation or the user's decentralized identifier is on the issuer's list of revoked attestations. Alternatively, the relying party may check to see if the attestation is on the attestation issuer's list of valid attestations. For example, the relying party's identity service component may perform these checks.

If the attestation is not on the attestation issuer's list of revoked attestations, or is on the attestation issuer's list of valid attestations, in step 545, the relying party may communicate that the attestation is valid to the relying party. For example, the relying party's identity service component may perform the communication.

If the attestation is on the attestation issuer's list of revoked attestations, or is not on the attestation issuer's list of valid attestations, in step 550, the relying party may communicate that the attestation is invalid to the relying party and/or the user. For example, the relying party's identity service component may perform the communication An exemplary use case is freezing an individual's credit. For example, the distributed ledger may be written with an instruction that freezes an individual's credit so that no entity can extend credit to the user when the user's credit is frozen. This may be useful in situations where, for example, the individual's identity is stolen.

In embodiments, the holder may not have direct access to the distributed ledger, and cannot write to the distributed ledger. For example, the holder may use a Trust Anchor organization, such as an Attestation Issuer, that allows the holder to receive attestations and that would publish the user's public key to the blockchain. This improves security of the system.

In other embodiments, the holders may have direct access to the distributed ledger.

Embodiments may enable real-time accuracy of user data by leveraging the distributed ledger to store pointers to revoked data, invalidated data, or other data, thereby preventing users from presenting false or outdated information about themselves, and ensuring that all parties have the same view of the most recent, verified data about a user.

Although multiple embodiments have been disclosed, it should be recognized that these embodiments are not mutually exclusive, and features from one may be used with another.

Hereinafter, general aspects of implementation of the embodiments will be described.

Embodiments of the invention or portions of thereof may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method of attestation revocation, comprising:
   receiving, by an attestation issuer computer program for an attestation issuer executed by an electronic device and from a user or the attestation issuer, a request to revoke an attestation issued by the attestation issuer, wherein the attestation represents a verifiable claim about the user in relation to the attestation issuer, wherein the attestation issuer automatically requests revocation in response to a user change in circumstances with regard to the attestation issuer;
   retrieving, by the attestation issuer computer program, a decentralized identifier for the user from a distributed ledger in a distributed ledger network, wherein the decentralized identifier for the user is unique to the user and is resolved to a standardized document that describes the user;

removing, by the attestation issuer computer program, the decentralized identifier for the user from a list of valid issued attestations for the attestation issuer; and sending, by the attestation issuer computer program, a confirmation of revocation to at least one of the user and the attestation issuer.

2. The method of claim 1, wherein the user change in circumstances is a change in user employment status.

3. The method of claim 1, wherein the user change in circumstances is a change in user account status.

4. The method of claim 1, wherein the user change in circumstances is a change in user location.

5. A method for decentralized digital identity attestation verification, comprising:

receiving, by an attestation issuer computer program for an attestation issuer executed by an electronic device and from a relying party, an attestation for a user and a request to verify the attestation, wherein the attestation represents a verifiable claim about the user in relation to the attestation issuer, wherein the attestation issuer automatically requests revocation in response to a user change in circumstances with regard to the attestation issuer;

retrieving, by the attestation issuer computer program, a user decentralized identifier for the user from a distributed ledger in a distributed ledger network, wherein the user decentralized identifier is unique to the user and is resolved to a standardized document that describes the user;

retrieving, by the attestation issuer computer program, an attestation issuer decentralized identifier for an attestation issuer from the distributed ledger, wherein the attestation issuer decentralized identifier is unique to the attestation issuer and is resolved to a standardized document that describes the attestation issuer;

validating, by the attestation issuer computer program, the user decentralized identifier and the attestation issuer decentralized identifier;

verifying, by the attestation issuer computer program, that the attestation has not been revoked by determining that the user decentralized identifier is not on a list of revoked attestations for the attestation issuer; and communicating, by the attestation issuer computer program, an indication that the attestation is valid to the relying party; and sending, by the attestation issuer computer program, a confirmation of revocation to at least one of the user and the attestation issuer.

6. The method of claim 5, further comprising:
verifying, by the attestation issuer computer program, a signature on the attestation verification request.

7. The method of claim 5, wherein the request is received via a mobile application executed by the user.

8. The method of claim 7, wherein the relying party presents the request to the mobile application as a machine-readable code.

9. The method of claim 7, wherein the request is signed with a private key for the user.

10. The method of claim 5, further comprising:
retrieving, by the attestation issuer computer program and from the distributed ledger, a public key for the user;
retrieving, by the attestation issuer computer program and from the distributed ledger, a public key for the attestation issuer;
validating, by the attestation issuer computer program, a user signature on the attestation using the public key for the user; and
validating, by the attestation issuer computer program, an attestation issuer signature on the attestation using the public key for the attestation issuer.

11. A non-transitory computer readable storage medium, including instructions stored thereon, which when read and executed by one or more computer processors, cause the one or more computer processors to perform steps comprising:

receiving from a user or an attestation issuer, a request to revoke an attestation issued by the attestation issuer, wherein the attestation represents a verifiable claim about the user in relation to the attestation issuer, wherein the attestation issuer automatically requests revocation in response to a user change in circumstances with regard to the attestation issuer;

retrieving a decentralized identifier for the user from a distributed ledger in a distributed ledger network, wherein the decentralized identifier for the user is unique to the user and is resolved to a standardized document that describes the user; and removing the decentralized identifier for the user from a list of valid issued attestations for the attestation issuer; and sending, by the attestation issuer computer program, a confirmation of revocation to at least one of the user and the attestation issuer.

12. The non-transitory computer readable storage medium of claim 11, wherein the user change in circumstances is a change in user employment status.

13. The non-transitory computer readable storage medium of claim 11, wherein the user change in circumstances is a change in user account status.

14. The non-transitory computer readable storage medium of claim 11, wherein the user change in circumstances is a change in user location.

\* \* \* \* \*